C. M. LEECH.
COMBINED FLY WHEEL AND TRANSMISSION GEARING.
APPLICATION FILED AUG. 25, 1911.
1,039,968.
Patented Oct. 1, 1912.
3 SHEETS—SHEET 1.
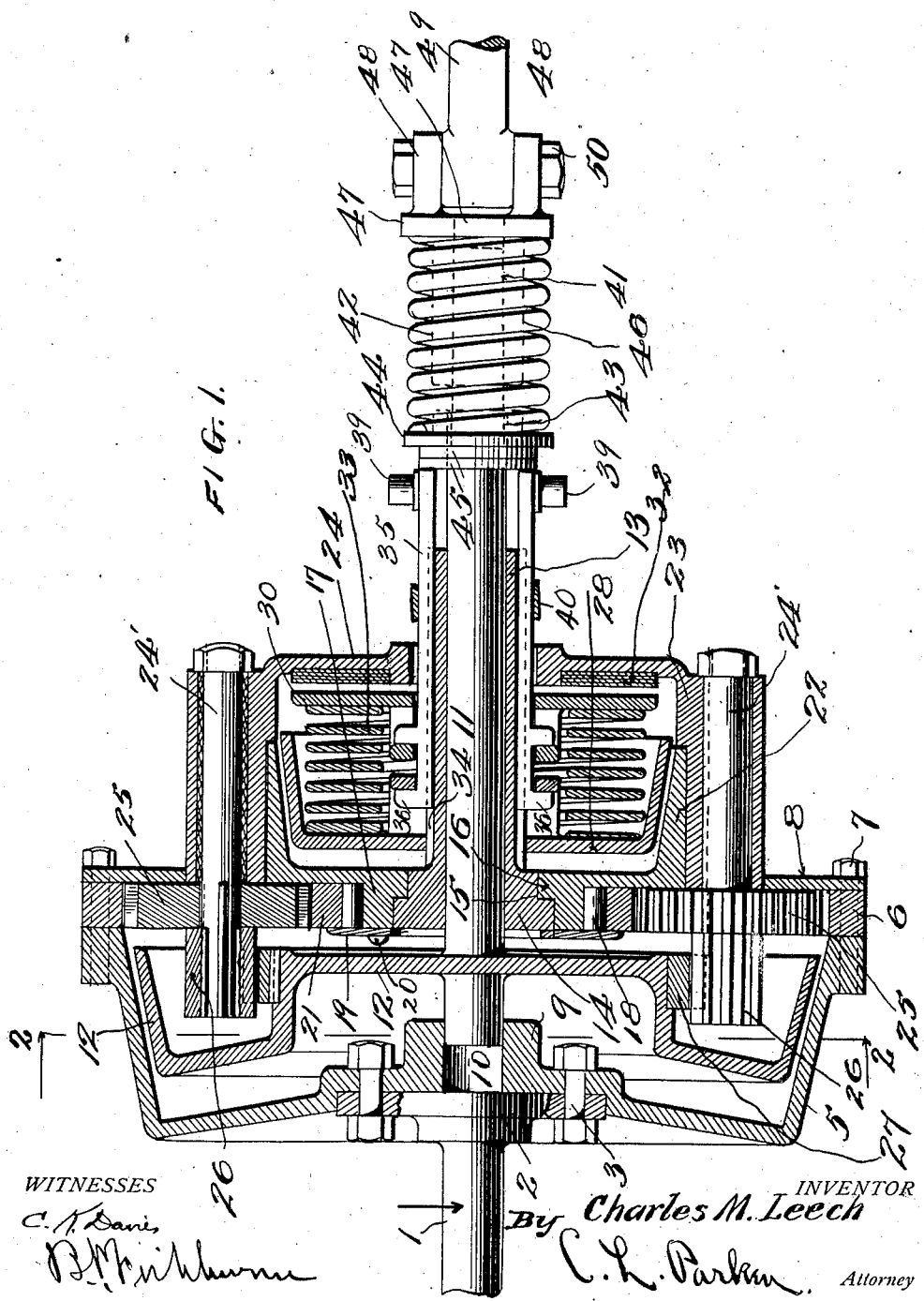
WITNESSES
INVENTOR
Charles M. Leech
Attorney C. M. LEECH.
COMBINED FLY WHEEL AND TRANSMISSION GEARING.
APPLICATION FILED AUG. 25, 1911.
1,039,968.
Patented Oct. 1, 1912.
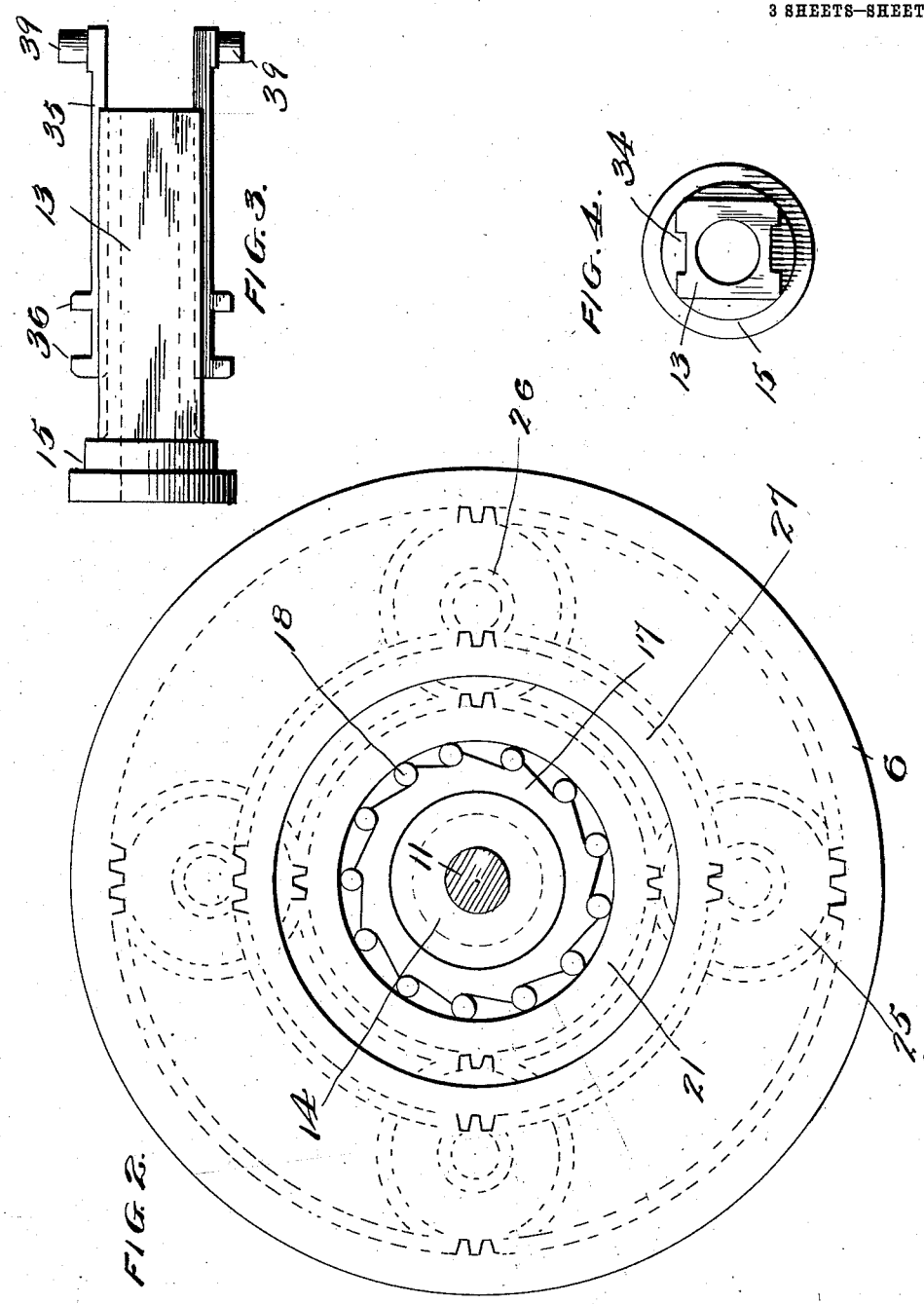

C. M. LEECH.
COMBINED FLY WHEEL AND TRANSMISSION GEARING.
APPLICATION FILED AUG. 25, 1911.
1,039,968.
Patented Oct. 1, 1912.
3 SHEETS—SHEET 3.
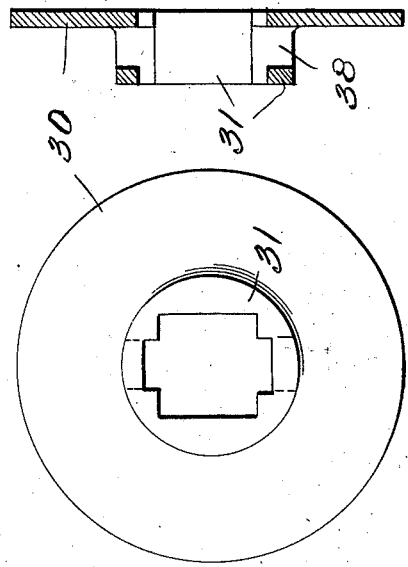
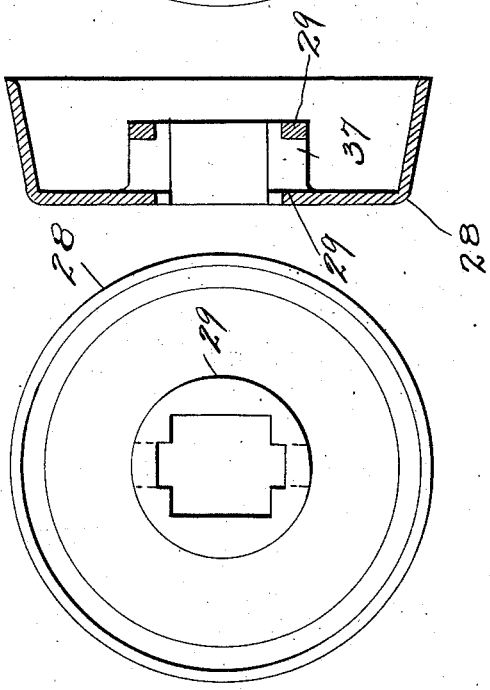
WITNESSES
INVENTOR
Charles M. Leech,
By
C. L. Parker.
Attorney

UNITED STATES PATENT OFFICE.

CHARLES M. LEECH, OF LIMA, OHIO.

COMBINED FLY-WHEEL AND TRANSMISSION-GEARING.

1,039,968.     Specification of Letters Patent.     Patented Oct. 1, 1912.

Application filed August 25, 1911. Serial No. 645,898.

*To all whom it may concern:*

Be it known that I, CHARLES M. LEECH, a citizen of the United States, residing at Lima, in the county of Allen and State of Ohio, have invented certain new and useful Improvements in Combined Fly-Wheels and Transmission-Gearing, of which the following is a specification.

This invention relates to a combined flywheel and variable speed transmission gearing adapted for use in connection with automobiles or the like.

An important object of the present invention is to provide a device of the above mentioned character, which is compact, positive in operation and comparatively simple in construction.

A further object of the invention is to provide a variable speed transmission gearing which is operated by a single lever for all speeds, namely forward, low and high speeds and reverse.

Other objects and advantages of this invention will be apparent during the course of the following description.

In the accompanying drawings forming a part of this specification and in which like numerals are employed to designate like parts throughout the same, Figure 1 is a central longitudinal sectional view through the device, Fig. 2 is a vertical transverse sectional view taken on line 2—2 of Fig. 1, the elements 5 and 12 being omitted, Fig. 3 is a plan view of a fixed or stationary bearing, Fig. 4 is a rear end view of the same, Fig. 5 is a rear end view of the forward brake member, Fig. 6 is a central transverse sectional view through the same, Fig. 7 is a forward end view of the rear brake member, and, Fig. 8 is a central vertical sectional view through the same.

In the drawings wherein is illustrated a preferred embodiment of my invention, the numeral 1 designates a crank shaft of the engine (not shown) which crank shaft is rotated in the direction indicated by the arrow. At its rear end this crank shaft carries a disk 2, to which is rigidly connected by means of bolts 3 a frusto-conical fly-wheel disk 5, faced as shown. Upon the open rear end of the disk 5 is rigidly connected an annular gear 6, connected therewith by bolts 7 or the like. This annular gear is provided with teeth upon its inner surface. The bolts 7 also serve to hold a ring 8 upon the annular gear 6, as shown.

The fly-wheel disk 5 is provided centrally thereof with a hub portion 9, provided with a cylindrical opening 10, for loosely receiving the forward end of a main shaft 11. This main shaft has a main clutch disk 12 rigidly connected therewith at its forward end, the said main clutch disk being preferably formed integral with the shaft 11, as shown. The main clutch disk 12 has the shape in cross-section, as shown and is disposed within the fly-wheel disk 5. The main clutch disk 12 may have its periphery preferably faced with leather or other suitable material, which is ordinarily employed between such elements. The main shaft 11 is journaled through a fixed or stationary bearing 13, and this shaft is capable of longitudinal movement within the bearing. This bearing has its forward end in the form of a head 14, provided with an annular groove 15, for receiving an annular flange 16, formed upon an annular ratchet wheel 17, the teeth of which are faced, as shown in Fig. 2. Disposed in engagement with the teeth of the ratchet wheel are rollers 18, held in place by a ring 19, which is rigidly connected with the ratchet wheel 17 by screws 20 or the like. The ring 19 also engages the head 14. Disposed for rotation in one direction only upon the rollers 18 is an annular gear 21, held in place by the ring 19 and provided upon its periphery with teeth, as shown. The ratchet wheel 17 has a substantially frusto-conical forward brake member 22 rigidly connected therewith, the same being preferably formed integral therewith.

Rotatably mounted upon the brake member 22 is a cylindrical casing 23, having its forward end formed open and its rear end closed by a head 24, provided centrally thereof with an opening for receiving the stationary bearing 13 and associated elements. The casing 23 has stub shafts 24' journaled therethrough, preferably at diametrically opposite points, and each of these stub shafts carries a planetary gear 25 and forwardly of the same a pinion 26, which are rigidly connected with the stub shaft by any suitable means. The planetary gears 25 are in mesh with the gears 6 and 21 and the pinions 26 are in mesh with an annular gear 27 which is rigidly connected with the hub portion of the main clutch disk 12, as shown.

Disposed within the forward brake member 22, is a substantially frusto-conical intermediate brake member 28, as shown. This intermediate brake member has a central hub portion 29 which is mounted upon the stationary bearing 13, the same being preferably splined thereon to move longitudinally but to be incapable of rotation upon the stationary bearing. The intermediate brake member 28 is adapted for movement into and out of engagement with the brake member 22. The brake member 28 is preferably provided upon its periphery with a strip of leather or the like.

The numeral 30 designates a rear brake member, having a central hub 31, which is splined upon the stationary bearing 13 to move longitudinally but to be incapable of rotation on the bearing. The brake member 30 is adapted to be moved into and out of engagement with a brake ring 32 rigidly mounted upon the inner face of the head 24. Disposed between the brake members 28 and 30 is a coil spring 33 possessing a desired degree of stiffness.

As shown in Fig. 4, the stationary bearing 13 is square in cross-section and is provided upon opposite sides with longitudinal grooves 34, for slidably receiving longitudinally movable shifting elements 35, provided at their forward ends with spaced outwardly extending lugs 36, for extending within openings 37 and 38, formed respectively in the hubs 29 and 31, as more clearly shown in Figs. 6 and 8. The elements 35 are provided at their rear ends with trunnions 39, adapted for pivotal connection with the forked end of an operating lever (not shown).

The numeral 40 designates a band surrounding the shifting elements 35 to prevent their displacement.

The rear end of the main shaft 11 is reduced and formed in a shank 41, which is square in cross-section and longitudinally movably mounted in a sleeve 42 but so mounted that it can not turn therein. The main shaft 11 is provided with a screw-threaded portion 43, engaged by a flanged ring 44, and friction reducing rings 45 are preferably interposed between the ring 44 and the forward ends of the elements 35, as shown. A compressible coil spring 46 of a desired degree of stiffness surrounds the sleeve 42 and engages the flanged ring 44 and a flange 47 formed upon the forward end of the sleeve 42. The flange 47 carries spaced ears 48, between which is disposed one end of a driven shaft 49 and a bolt 50 pivotally connects these elements, as shown. The shaft 49 is suitably connected with the rear wheels of the automobile or other mechanism to be driven and is free to rotate but can have no perceptible longitudinal movement.

The operation of the device is as follows:— When the shifting elements 35 occupy their normal starting position, as shown in Fig. 1, the rotation of the shaft 1 is imparted to the disk 5 and the annular gear 6 which in turn rotates the planetary gears 25 and the pinions 26. The load being on the disk 12, the pinions 26 will travel about the annular gear 27 and rotate the annular gear 21, which moves the rollers 18 and locks the annular gear 21 and the ratchet wheel 17 for rotation together. The ratchet wheel 17 and casing 23 now rotate idly about the shaft 11 without transmitting the rotation of the shaft 1 to the same. When the shifting elements are brought forwardly to the first position, the member 28 engages the member 22, holding the latter against rotation. The annular gear 21 is now prevented from rotating, whereby the planetary gears 25 are made to travel about the annular gear 21 and the pinions 26 will rotate the annular gear 27 forwardly at a much reduced speed from the rotation of the shaft 1. This rotation is transmitted to the main disk 12 and subsequently to the main shaft 11 which is therefore driven at forward low speed. When the shifting elements 35 are moved forwardly to their second position, the member 28 still holds the member 22 against rotation and the spring 42 will cause the main shaft 11 to move longitudinally, bringing the members 5 and 12 into direct frictional engagement. The shaft 11 will now be driven directly from and at the same speed as the shaft 1. It is thus seen that the elements 1, 5, 12, 25, 26 and 11 move as an integral structure. When the rotation of the shaft 11 is reversed, the shifting elements 35 are first returned to their normal or starting position and subsequently moved rearwardly for bringing the member 30 into engagement with the brake ring 32, whereby casing 24 is locked against rotation. The annular gear 6 will now rotate the planetary gears 25 and pinions 26 to cause the annular gear 27 to be rotated in a reverse direction. This reverse rotation is accordingly imparted to the shaft 11, which is now driven at reverse low speed.

I wish it understood that the form of my invention herewith shown and described is to be taken as a preferred example of the same and that certain changes in the shape, size and arrangement of parts may be resorted to without departing from the spirit of the invention or the scope of the subjoined claims.

Having thus described my invention, I claim:—

1. In a device of the character described, a driving disk, an annular gear connected with the driving disk, a longitudinally movable shaft, a friction disk carried thereby and movable into and out of engagement with said driving disk, a stationary bearing for the longitudinal movable shaft, a rotatable casing, planetary gears and pinions carried by the casing, an annular gear connected with said friction disk, said planetary gears and pinions engaging respectively the first and second named annular gears, a third annular gear engaging the planetary gears, and means to hold said third annular gear and said rotatable casing against rotation.

2. In a device of the character described, a driving shaft, a fly wheel disk connected therewith, a stationary bearing, a main clutch disk disposed near said fly-wheel disk, a main shaft rotatably and longitudinally movably mounted in said stationary bearing, a casing rotatably mounted about the main shaft, stub shafts carried by the casing, planetary gears and pinions carried by the stub shafts, an outer annular gear connected with the fly-wheel disk and engaged by the planetary gears, an inner annular gear engaged by said planetary gears, a third annular gear connected with the main clutch disk and engaged by said planetary pinions, a ratchet wheel disposed within the inner annular gear, rollers disposed between the teeth of said ratchet wheel and said inner annular gear, means to prevent the rotation of the ratchet wheel, and the casing, and means to move the main shaft longitudinally.

3. In a device of the character described, a fly-wheel disk, a stationary bearing, a main shaft longitudinally movably and rotatably mounted in the stationary bearing, a main clutch disk rigidly connected with the main shaft for movement into and out of engagement with the fly-wheel disk upon the movement of said main shaft, a ratchet wheel rotatably mounted upon the stationary bearing, a clutch disk rigidly connected with said ratchet wheel, rollers disposed upon the ratchet wheel, an inner annular gear disposed upon the rollers, a casing rotatably mounted upon the last named clutch disk, stub shafts carried by said casing, an outer annular gear connected with the fly-wheel disk, planetary gears carried by the stub shafts and engaging the outer and inner annular gears, a third annular gear connected with the main clutch disk, pinions carried by the stub shaft and engaging said third annular gear, a disk splined upon the stationary bearing and movable into and out of engagement with the third named disk, a disk splined upon the stationary bearing and movable into and out of engagement with a portion of said casing, and means to move the two last named disks.

4. In a device of the character described, a fly-wheel disk, a stationary bearing, a main shaft longitudinally movably and rotatably mounted in the stationary bearing, a main clutch disk rigidly connected with the main shaft, a ratchet wheel rotatably mounted upon the stationary bearing, a forward brake member rigidly connected with said ratchet wheel, rollers mounted upon the ratchet wheel, an inner annular gear mounted upon the rollers, an outer annular gear connected with the fly-wheel disk, planetary gears disposed between the inner and outer annular gears, a third annular gear having connection with the main clutch disk, planetary pinions connected with the planetary gears and engaging the third named annular gear, an element for holding the forward brake member against rotation, and means for preventing said gears and pinions from partaking of a planetary movement and causing the same to rotate on their axes.

5. In a device of the character described, a stationary bearing, rotatable elements mounted about the same, brake members mounted between the rotatable elements and splined upon the stationary bearing, a spring disposed between said brake members, and means for moving each of the brake members to cause the same through the medium of the spring to move the other brake member.

6. In a device of the character described, a stationary bearing, a shaft longitudinally movably and rotatably mounted in the stationary bearing, rotatable elements, brake elements disposed between the rotatable elements and splined upon the stationary bearing, a spring disposed between the brake elements, shifting elements slidably mounted upon the stationary bearings and engaging said brake elements, means fixed to the shaft and engaging the shifting elements, and a spring for moving said means.

7. In a device of the character described, a stationary bearing, a shaft longitudinally movably and rotatably mounted in the stationary bearing, rotatable elements disposed about the shaft, brake elements disposed between the rotatable elements, a spring disposed between the brake elements, shifting means engaging the brake elements, and means to move the shifting means.

8. The combination with a fly wheel disk provided with an annular gear, of a longitudinally movably rotatable shaft, a friction disk connected with the longitudinally movable shaft and movable into and out of engagement with the fly wheel disk, said friction disk being provided with an annular gear, a rotatable structure, planetary gears and pinions carried by the rotatable structure, a freely rotatable annular gear, and means to hold the same against rotation.

9. In a device of the character described, a main driving element, a main driven element, gearing between the main driving and driven elements, including planetary gears, a rotatable support for the planetary gears, rotatable means with which some of the planetary gears engage, said rotatable means including rotatable elements adapted to have relative rotary motion in one direction and to be locked together upon relative rotary motion in a reverse direction, whereby the two rotatable elements rotate together, and means movable in one direction to hold one of said rotatable elements against rotation and in a reverse direction to hold the rotatable support against rotation.

10. In a device of the character described, a fly-wheel disk, a friction disk, means to move the friction disk into and out of engagement with the fly-wheel disk, gearing between the fly-wheel disk and friction disk, including planetary gears, a rotatable support for the planetary gears, rotatable means with which some of the planetary gears engage, said rotatable means including rotatable elements adapted to have relative rotary movement in one direction and to be locked together upon such relative rotary movement in a reverse direction, and means movable in one direction to hold one of said rotatable elements against rotation and in a reverse direction to hold the rotatable support against rotation.

In testimony whereof I affix my signature in presence of two witnesses.

CHARLES M. LEECH.

Witnesses:
W. L. RISLEY,
CLARENCE C. MILLER.